United States Patent [19]

Glucksman et al.

[11] Patent Number: 5,588,353
[45] Date of Patent: Dec. 31, 1996

[54] AUTOMATIC BREAD-MAKING APPARATUS

[75] Inventors: Dov Z. Glucksman, Wenham; Karl H. Weidemann, Hull, both of Mass.

[73] Assignee: Appliance Development Corp., Danvers, Mass.

[21] Appl. No.: 503,557

[22] Filed: Jul. 18, 1995

[51] Int. Cl.⁶ ................................................. A47J 27/00
[52] U.S. Cl. .................... 99/348; 99/468; 99/475
[58] Field of Search .......................... 99/325, 326, 327, 99/328, 331, 332, 333, 342, 344, 468, 486, 475, 473, 474, 348, 476, 470; 219/400; 126/21 A, 21 R, 19 R, 39 C, 273 R; 426/523

[56] References Cited

U.S. PATENT DOCUMENTS

| | | | |
|---|---|---|---|
| 4,071,738 | 1/1978 | Jenn et al. | 219/400 |
| 4,457,292 | 7/1984 | Jorgensen et al. | 126/21 |
| 4,561,348 | 12/1985 | Halters et al. | 99/421 |
| 4,601,279 | 7/1986 | Guerin | 126/21 |
| 4,776,265 | 10/1988 | Ojima | 99/348 |
| 4,824,644 | 4/1989 | Cox et al. | 126/21 |
| 4,829,158 | 5/1989 | Burnham | 219/400 |
| 4,870,254 | 9/1989 | Arabori et al. | 219/400 |
| 4,903,587 | 2/1990 | Nagasaka et al. | 99/325 |
| 4,951,559 | 8/1990 | Arao et al. | 99/348 |
| 5,029,519 | 7/1991 | Boyen | 99/403 |
| 5,076,153 | 12/1991 | Takahashi et al. | 99/348 |
| 5,142,125 | 8/1992 | Fioroli et al. | 219/400 |
| 5,193,520 | 3/1993 | Gostelow et al. | 126/21 |
| 5,205,274 | 4/1993 | Smith et al. | 99/474 |
| 5,351,606 | 10/1994 | Matsuzaki | 99/468 |
| 5,392,695 | 2/1995 | Junkel | 99/348 |
| 5,410,949 | 5/1995 | Yung | 99/325 |
| 5,426,580 | 6/1995 | Yoshida et al. | 99/348 |
| 5,510,127 | 4/1996 | Wong et al. | 426/523 |

FOREIGN PATENT DOCUMENTS

| | | | |
|---|---|---|---|
| 0463657 | 1/1992 | European Pat. Off. | 99/447 |
| 59-1930 | 1/1984 | Japan | 126/21 A |
| 202333 | 11/1984 | Japan | 126/21 A |
| 300121 | 12/1989 | Japan | 126/21 A |
| 2057219 | 2/1990 | Japan | 99/470 |

*Primary Examiner*—David Scherbel
*Assistant Examiner*—James F. Hook
*Attorney, Agent, or Firm*—Sofer & Haroun, LLP

[57] ABSTRACT

An automatic bread making apparatus including a housing having an interior surface and defining a top opening is provided. A top cover is provided for covering the top opening of said housing, the top cover having an interior wall and an interior partition, with the interior partition defining a space between the top cover interior wall and the interior partition. A baking chamber having interior and exterior surfaces, the baking chamber positioned within the housing to form an air space between the interior surface of the housing and the exterior surface of the baking chamber is also provided. The baking chamber defines an opening covered by the partition. A baking pan made of a heat-conductive material is also provided, the baking pan positioned within the baking chamber to define an air space between the interior surface of the baking chamber and the baking pan. A first centrifugal impeller is mounted within the cover and configured to supply and circulate heated air to the air space defined between the interior surface of the baking chamber and the baking pan. A second centrifugal impeller mounted within the cover and configured to supply cool air to the space defined between the interior surface of the housing and the exterior surface of the baking chamber and between the interior wall of the top cover and the partition.

18 Claims, 4 Drawing Sheets

AUTOMATIC BREAD-MAKING APPARATUS

FIELD OF THE INVENTION

The present invention relates generally to a bread-making apparatus wherein the apparatus automatically kneads the dough, allows the dough to rise and then bakes the raised dough into a loaf of bread from prespecified ingredients filled into a baking pan and, more particularly, to an apparatus configured to prepare and to deliver a uniformly and evenly baked loaf of bread at a predesignated hour of the day, independent of the time the bread making was started.

BACKGROUND OF THE INVENTION

During the past ten years, various different kinds of breadmaking machines have been introduced into the consumer market. All of these bread-making machines automatically mix and knead dough once the necessary ingredients have been provided, let the dough rise and then bake the dough into a loaf of bread of a desired crispness. Electronic circuitry is integrated within the apparatus and can be programmed to execute the different steps in their certain desired order and timing depending on the kind of bread a user desires to bake. In this way, all the user has to do is to place the correct specified ingredients into the baking pan and to select the bread type corresponding to the ingredients.

Existing prior art bread-making machines essentially include, a baking pan, a kneading blade provided in the bottom portion of the baking pan and an electric motor which rotates the kneading blade for a predetermined period of time. The pan, which has an open top, is removable from the appliance in order to extract the ready loaf from the pan as well as for cleaning purposes. The pan is surrounded by a baking chamber, the baking chamber being provided with an open top portion which is tightly closed by a cover during bread making. The baking chamber contains a heating element in its bottom portion which can be energized to the correct temperature and timing by the aforementioned electronic circuitry. The air heated in the baking chamber transmits the heat energy to the dough in the baking pan by natural convection through the open top portion and by conduction through the metallic walls. An outer housing encloses the baking chamber and contains, inter alia, the electric motor and drive for rotating the kneading blade, the electronic circuitry and a keyboard for selecting the suitable bread type.

Existing bread making machines have certain drawbacks. Some these drawbacks include the fluctuations and uneven distribution of temperature in the baking chamber, with higher temperature air rising to the top and lower temperature air remaining near the bottom. As a result of this temperature differential, a prior art temperature sensor will not be able to deenergize the heater whenever the correct baking temperature has been reached, thus causing large temperature fluctuations during the baking process which result in the problems associated in baking of the bread ie. uneven and incomplete baking. A second drawback is that the outer housing becomes excessively hot by the convection and radiation from the hot wall of the baking chamber during the long baking time. In view of this excessive heat, prior art machines require that the housing be made of metal instead of plastic material. As is obvious, a plastic housing is less costly and more aesthetically acceptable than a metal one. Additionally, in order to overcome the temperature fluctuations and the uneven temperature distributions described previously, most bread making apparatuses include a baking pan of heavy die-cast aluminum adding considerably to the total cost of the appliance.

It is the main object of the present invention to eliminate these drawbacks and to provide a bread-making apparatus wherein the air surrounding the baking pan remains at a substantially uniform temperature during the entire baking process.

It is another object of the present invention to increase the heat transfer to the dough in the baking pan by providing hot air flow along the metallic walls of the baking pan, thereby accelerating the baking process and shortening the baking time. By providing air flow around the metallic walls of the baking pan, it becomes possible to replace the previously mentioned heavy baking pan by a low-cost thin-walled pan altogether.

It is a further object of the invention to provide means for cooling the outside of the baking chamber and thereby prevent the outer casing from being heated to an unpleasantly high degree.

It is an additional object of the invention to provide the apparatus with an outer housing made of a plastic material which results in a substantial cost reduction without the danger of a user being burned by an excessively hot surface.

Additionally, applicants incorporate by reference the disclosure of U.S. application Ser. No. 08/503,652, filed concurrently herewith and also entitled "AUTOMATIC BEAD-BAKING MACHINE".

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

SUMMARY OF THE INVENTION

A preferred embodiment of the bread making apparatus according to the present invention includes a baking pan and a motor-driven mixing blade, the blade being similar to those of conventional machines. The pan may be either cylindrical, block-shaped, or rectangular, open at its top and made of a heat-conductive metal such as aluminum. It is firmly, but releasably fastened to the bottom of the baking chamber which surrounds it on all sides in spaced-apart relationship so as to permit air circulation all around the pan. The baking chamber is provided with a top portion which can be tightly closed by a cover to be opened to give access to the baking pan and to the baking chamber. In a preferred embodiment of the invention, the baking chamber material is molded out of a high temperature plastic known in the trade as "bulk-molding compound" which is a thermoset plastic consisting of polymer and inert bulk filler. A housing encloses the baking chamber in spaced relationship from its sides and bottom and has a horizontal top opening in a common plane with the opening of the baking chamber, both openings being closed by a hinged common cover.

Hot air is circulated all around the baking pan for improving heat transfer and for heating of the entire pan surface to a uniform temperature. Cooler air is circulated through the space between the baking chamber and the outer housing in order to keep the housing in a cooler state relative to the baking chamber.

The cover, which is common to both the baking chamber and the housing, includes two overlying substantially horizontal compartments, separated by a dividing space. The first or top compartment communicates with the space between the housing and the baking chamber while the second or bottom space communicates with the inside of the baking chamber. Air circulation is obtained by two centrifugal impellers mounted at both ends of a double-shaft motor which is vertically positioned in the dividing space, of which the lower impeller is enclosed by a shroud formed in the bottom compartment and the upper impeller in the top compartment. The air is heated by a resistor heater mounted in the bottom compartment of the top cover. In this way, the air stream moved by the first impeller is circulated through the space between the interior surface of the baking chamber and the baking pan.

Fresh air is sucked in by the upper blower impeller through inlet ports in the bottom portion of the apparatus, is conveyed through the air spaces between the housing and the baking chamber and through the dividing space—cooling the motor—and entering the top impeller through an inlet in the partition between the dividing space and the top compartment, the impeller blowing into the open through vents in the outer cover wall.

The housing includes a main portion of substantially rectangular cross section and a lateral chamber on one side of the main portion, the latter containing the mixing and kneading motor which is vertically positioned with its shaft extending downwardly into a base compartment which supports the aforedescribed components. The base compartment contains the belt drive to a large belt pulley at the lower end of a shaft carrying the mixing and kneading blade.

Electronic controls for the motors and the heating element as well as a micro-processor are positioned in the lateral chamber and a keyboard and display are attached to the outside of the housing in a position permitting ready operation by the consumer.

Bread baked by the apparatus of the present invention is more uniform than bread produced by the known bread makers owing to the fact that the pan is surrounded by air of uniform temperature and that heat transfer is improved by continuous air flow around the pan. This also permits a shortened bake time, or baking at lower temperatures as well as substantial savings in energy consumption.

By cooling the inside of the housing, this prevents the housing from overheating by the radiation and convection from the surface of the baking chamber, thus permitting the housing to be manufactured of a plastic material, thereby reducing the total weight of the apparatus as well as its production costs. As well, by providing a resistor heater, such as a wire wound straight or coiled around a piece of mica board, a substantial reduction in the cost of the appliance compared with the cost of the sheathed tubular heating element necessary in conventional bread making machines is realized.

As a result of uniform air temperature and small fluctuations in baking chamber temperatures, it becomes possible to bake bread in a thin-walled metal pan, e.g. of aluminum or steel which is lighter, less costly and heats up faster than heavy die-cast aluminum pans provided in conventional bread makers.

BRIEF DESCRIPTION OF THE DRAWINGS

In the drawings, wherein like reference characters denote similar elements throughout the several view.

DETAILED DESCRIPTION OF THE DRAWINGS

Figure 1:
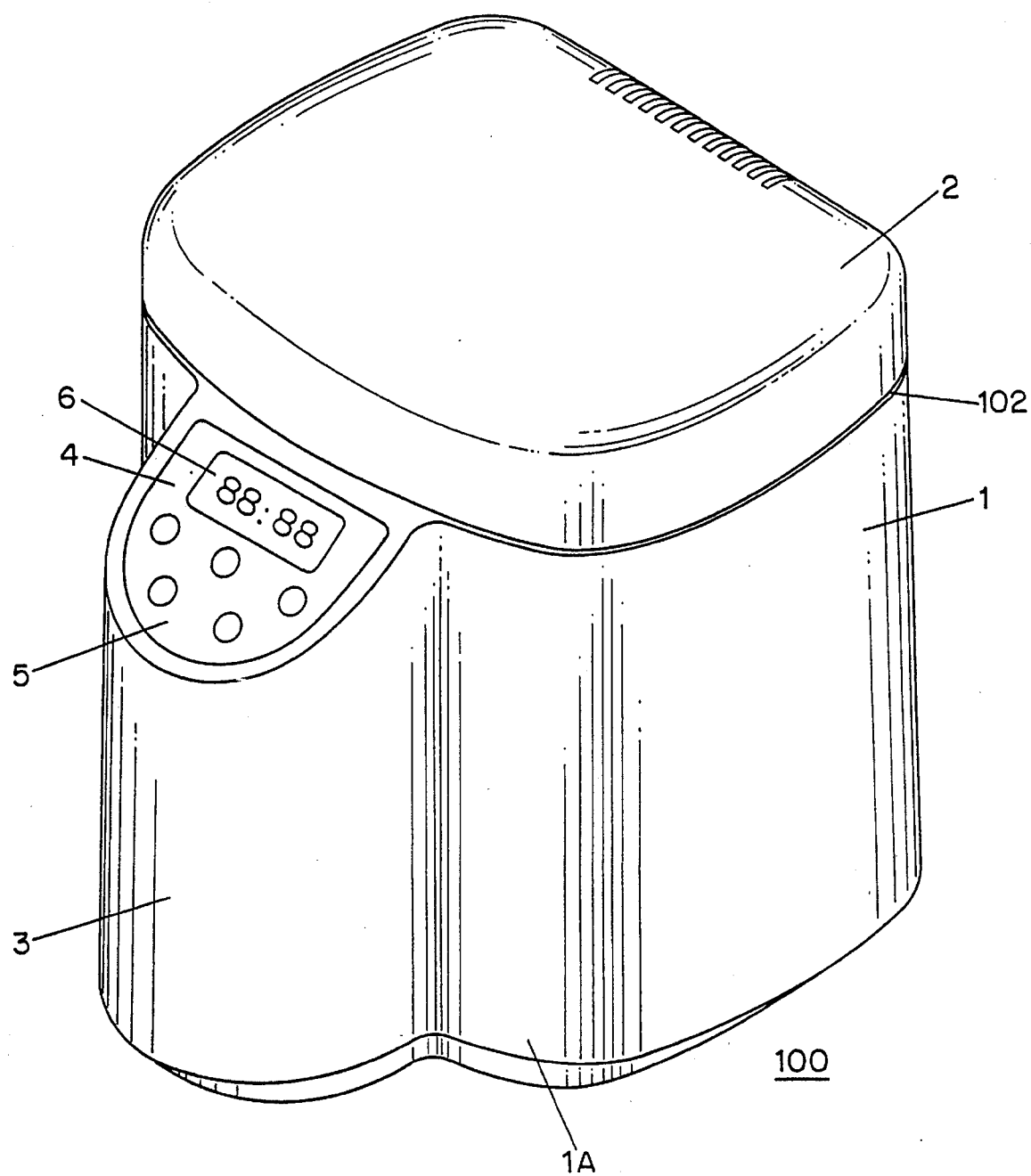
FIG. 1 is an isometric view of an embodiment of the bread making apparatus constructed in accordance with an illustrative embodiment of the invention.
Figure 2:
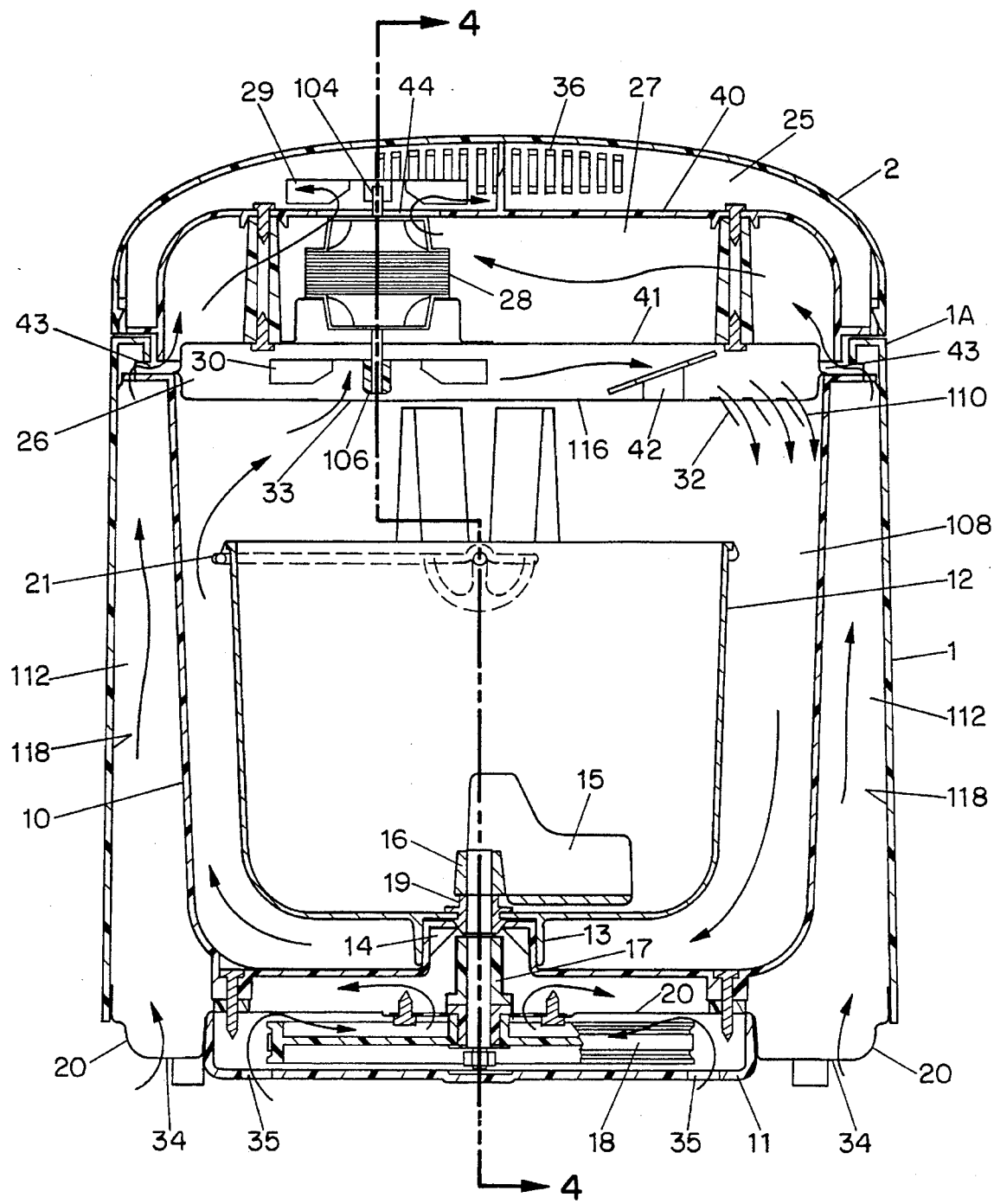
FIG. 2 is a vertical section of the bread making apparatus of FIG. 1.

Referring now to the drawings for a more detailed description of the present invention and more particularly to FIG. 1, a preferred embodiment of the bread making apparatus denoted generally as element 100 is shown. The bread-making apparatus 100 includes a box-shaped housing 1 and a cupola-shaped cover 2. The main portion of the housing 1 is enlarged on one side 1A by a lateral chamber 3 of semi-cylindrical shape having a sloping top surface 4 which contains a keyboard 5 and a display 6. As shown in FIG. 2, the cover 2, which is provided with an outer shell 2A, closes both the top of the housing 102 and that of a baking chamber 10, both by sealing connections.

The operation of the apparatus 100 can be best explained with reference to FIGS. 2 and 4. The baking chamber 10 of rectangular cross section is firmly mounted on a base plate 20 which also supports housing 1.

A baking pan 12 is positioned inside the baking chamber 10 and held there by a downwardly extending rectangular collar 13 slid over a block-shaped protrusion 14 extending from the bottom of the baking chamber 10 in an upward direction. This connection secures the baking pan 12 during mixing and kneading of the dough and permits its ready lifting out of the baking chamber 10 for removing the ready-baked bread 24 and for cleaning purposes. A mixing and kneading blade 15 is releasably mounted on a vertical shaft 16 which is guided in a bearing housing 17 and enters the baking pan 12 through a seal 19. The shaft carries a pulley 18 at its lower end serving to transmit the torque from a vertical motor 7 positioned in the lateral chamber 3 via a small pulley 8 and a belt 9 to the blade 15. However, as is apparent to one skilled in the art, any type of torque transmitting means such as worm gearing, planetary gearing or sprocket gearing may be utilized. It can be seen that the belt drive 9 is positioned in the base compartment 11 which is closed by the base plate 20 to protect the belt drive 9 from heat radiated by the baking chamber 10. A handle 21 is attached to the top of the baking pan 12 for its ready gripping and lifting.

Figure 4:
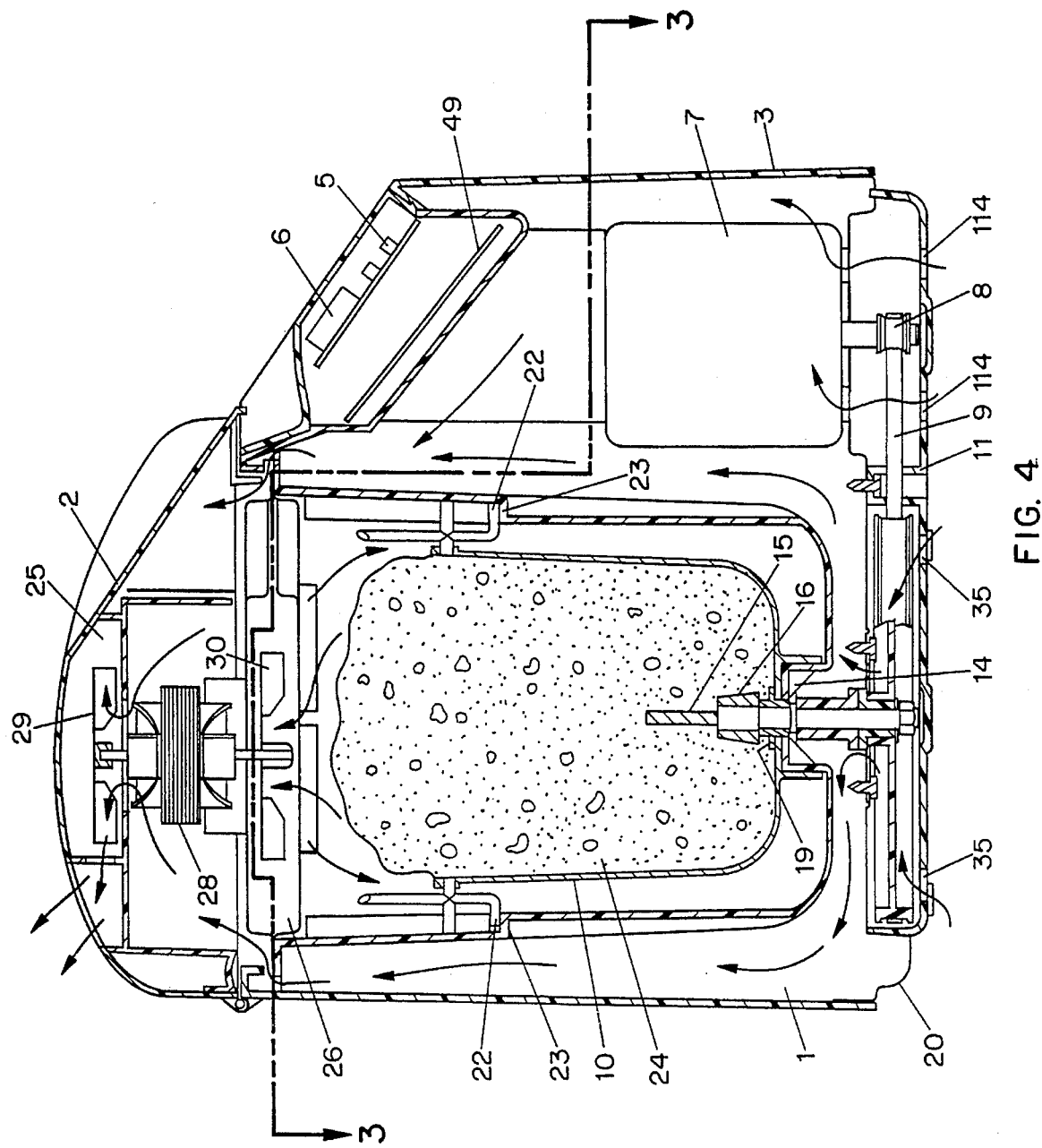
FIG. 4 is a horizontal section along line 4—4 of FIG. 2.

As illustrated in FIG. 4, the baking pan 12 includes side brackets 22 which additionally support the baking pan 12 on steps 23 of the baking chamber 10.

The baking pan 12 is heated by circulated hot air. Additionally, the inside of the housing 118 and the outside of the baking chamber 10 are cooled by a continuous stream of fresh outside air. For this purpose, the cover 2 is divided by partitions 40 and 41 into three horizontal compartments: a top compartment 25 which includes an impeller 29 between cover 2 and partition 40 for cooling space 112 and for exhausting the cool air; a bottom compartment 26 which contains an impeller 30 for circulating the hot air in the baking chamber 10; and a dividing space 27 which houses a vertically oriented double-shaft motor 28. The two opposite shafts 104 and 106 of motor 28 extend into the top 25 and bottom 26 compartments respectively, carrying each one centrifugal impeller 29 and 30.

Figure 3:
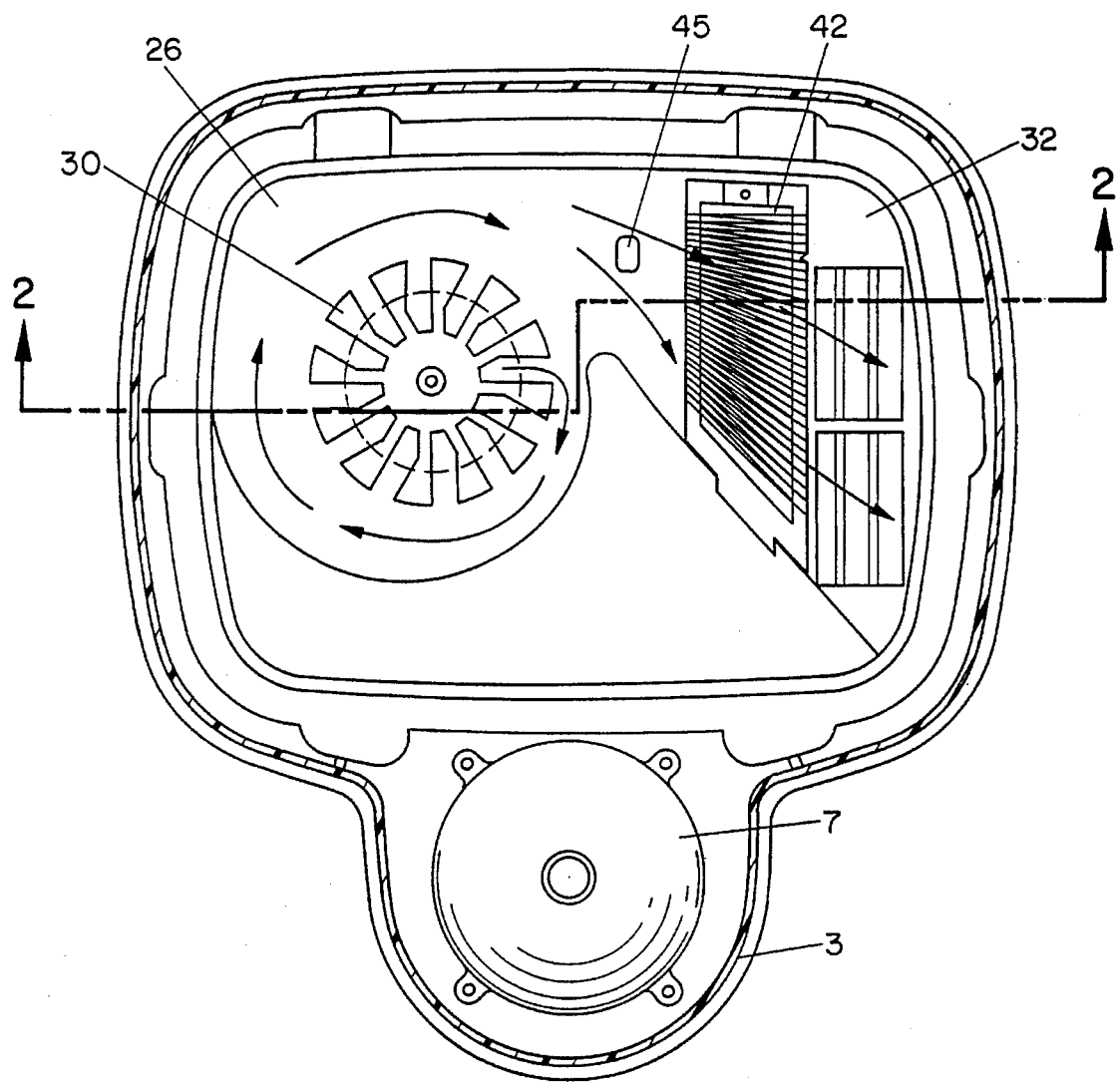
FIG. 3 is a section along line 3—3 of FIG. 2.

Hot air is circulated inside the baking chamber 10 and around the baking pan 12 (FIG. 2) by the centrifugal impeller 30 in the bottom compartment 26. Partition 116 serves as an impeller shroud and duct and contains an obliquely positioned open coil resistor heater 42 best shown in FIG. 5. Air heated by the resistor heater 42 is blown by impeller 30 into space 108 between baking chamber 10 and baking pan 12—as shown in FIG. 2 by arrows 110—through a grille 32 and is returned to the impeller 30 via a return port 33 in the bottom of the compartment, after having been circulated around the baking pan 12. As shown in FIG. 3, air temperature is sensed by a sensor 45 located inside the air stream in the bottom compartment 26 between the impeller 30 and heater 42. As is apparent to those skilled in the art, the sensor 45 may be located anywhere along the air stream so that accurate and reliable temperature sensing may be obtained. The sensor output is fed to a microprocessor 49 which processes the information in conjunction with the selected program and controls heat output so as to maintain the correct temperature during all stages of the process.

Figure 5:
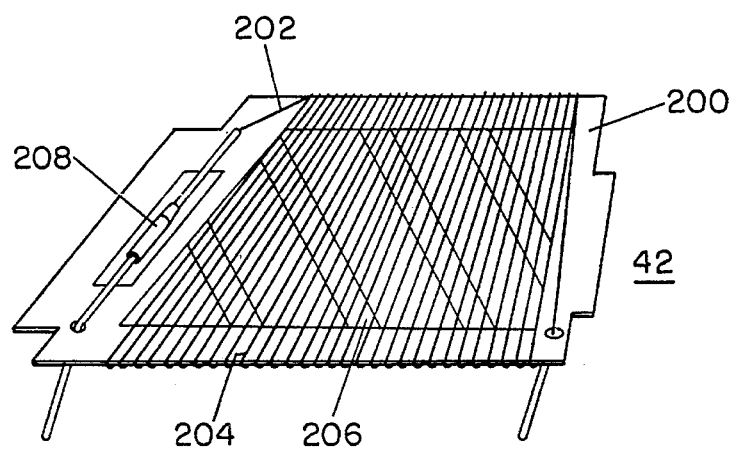
FIG. 5 is a plan view of the resistor heater as shown in FIG. 3.

Referring specifically to FIG. 5, the resistor heater 42 is fabricated out of a mica board frame 200, the mica board having a thickness of approximately 0.065 inches. In this way, the heater wire 202 may be wound from end to end to form a plurality of substantially parallel loops of heater wire 204. Also as shown in FIG. 5, the mica board frame 200 may be provided with one or more supports 206 which provide rigidity to the mica board frame 200 when the heater wire 202 is wound about the frame 200. A thermofuse 208 is provided to cut-off power in case of dangerous overheating of the resistor heater 42. As shown in FIG. 3, the resistor heater 42 is oriented about 20 degrees relative to the horizontal air stream, thus allowing the air to be directed around as well as through the resistor heater 42.

Cooling of the exterior of the baking chamber 10 and the interior of the housing walls 118 is effected by outside air drawn in by an upper centrifugal impeller 29 through inlet ports 34 in the base plate 20, and ports 35 in the bottom of the base compartment 11, rising through the space 112 between the interior walls 118 of the housing and the exterior walls of the baking chamber 10 and into the dividing space 27 through openings 43 along the circumference. From the dividing space 27—while cooling the blower motor 28—the air is conveyed to the top compartment 25 through a port 44 concentric with impeller 29. The air is then exhausted out through outlet slits 36 in the cover wall 2. The air flow is shown by arrows in both FIGS. 2 and 4.

The lateral chamber 3 mainly houses motor 7 which is also cooled by air drawn in by air impeller 29 through inlet ports 114 in the base compartment 11 and is controlled by a micro-processor 49 positioned below keyboard 5 and display 6.

The user will usually fill the necessary ingredients into the baking pan, close the cover and select the baking mode and the time he or she wishes to have a fresh-baked bread. The machine will start mixing and kneading the ingredients into a dough, stop the mixing blade after a pre-designated time period and let the dough rise at a pre-determined temperature suitable for enhanced rising of dough. It will start the baking process at a time as ordered by the user—say in early morning—and stop it after the bread is completely baked. As an optional feature air circulation by both blowers can be continued after the heater has been switched off. This will serve to condense the water out of the moist air and to collect it in the bottom of the baking chamber, thereby preventing the baked bread from becoming soggy. It will be understood that the shape and configuration of the housing and the working components may be modified to suit the consumer's taste as long as the principle of air circulation is maintained. For instance, instead of the rectangular cross section of both baking pan and chamber, both may be of any shape according to the desired shape of bread loaves. Instead of having the motor compartment in semi-cylindrical shape attached to one side of the main housing, the latter may be of oval cross section with the kneading motor at one end.

Fixation of the baking pan 12 inside the baking chamber 10 may be in any way that permits firm holding against angular displacement and ready lifting out with ready baked bread. In short, the apparatus 100 may be given any desired aesthetic shape, provided the impellers are mounted on an electric motor coupled to both housing 1 and baking chamber 10.

It should be understood that the preferred embodiments and examples described are for illustrative purposes only and are not to be construed as limiting the scope of the present invention which is properly delineated only in the appended claims.

What is claimed is:

1. An automatic bread making apparatus for baking dough, said apparatus comprising:
   a housing having an interior surface and defining a top opening;
   a top cover for covering the top opening of said housing, said top cover having an interior partition, said interior partition defining a first compartment adjacent one side of said partition for circulating cool air and a second compartment adjacent a second side of said partition for circulating hot air;
   a baking chamber having interior and exterior surfaces, said baking chamber positioned within said housing to form an air space between the interior surface of said housing and the exterior surface of said baking chamber, said air space coupled to said first compartment;
   a baking pan made of a heat-conductive material, said baking pan positioned within said baking chamber to define an air space between the interior surface of said baking chamber and said baking pan, said air space coupled to said second compartment;
   a first impeller coupled to said second compartment and configured to supply and circulate heated air; and
   a second impeller coupled to said first compartment and configured to supply and circulate cool air.

2. The bread making apparatus of claim 1, further comprising a double-shaft motor mounted within said cover wherein each of said shafts are oriented along a substantially vertical axis, wherein said first impeller and said second impeller are mounted on opposite ends of said double-shaft motor, said first impeller mounted proximate to said baking chamber and said second impeller mounted proximate to said top cover.

3. The bread making apparatus of claim 1, further comprising a mixing and kneading blade positioned within said baking pan, wherein said housing further comprises a lateral side chamber and a base portion, said lateral side chamber containing a motor for driving said mixing blade about a substantially vertical axis.

4. The bread making apparatus of claim 1, further comprising heater means mounted within said top cover for heating the air moved by said first impeller and for providing a hot air stream which surrounds said baking pan.

5. The bread making apparatus of claim 4, wherein said heater means further comprises a resistor heater.

6. The bread making apparatus of claim 5, wherein said resistor heater further comprises a frame, said frame having first and second ends in opposite spaced apart relation, wherein a heater wire is wound from said first end to said second end to form a plurality of resistance wire loops between said opposite first and second ends, wherein air supplied by said first impeller may be forced through the resistance wire loops defined between the opposite sides of the resistor heater.

7. The bread making apparatus of claim 4, further comprising a temperature sensor positioned within said hot air stream.

8. The bread making apparatus of claim 7, wherein said temperature sensor is positioned between said first impeller and said heater means.

9. The bread making apparatus of claim 1, further comprising a bearing housing positioned below said baking chamber, said bearing housing being provided with means for firmly securing said baking pan against angular movement and for permitting removal of said baking pan from said baking chamber, said bearing housing further comprising a shaft extending from said bearing housing into said baking pan.

10. The bread making apparatus of claim 3, further comprising an electric motor having a shaft extending toward said base portion, said shaft connected to a first pulley, a second pulley mounted on the downwardly extending shaft of said bearing housing and a drive belt connecting said first and second pulleys.

11. The bread making apparatus of claim 10, further comprising a mixing and kneading blade mounted for rotation within said baking pan, said blade being releasably mounted from said shaft.

12. The bread making apparatus of claim 1, wherein said housing is fabricated out of a plastic material.

13. The bread making apparatus of claim 12, wherein said plastic material is polypropylene.

14. The bread making apparatus of claim 2, further comprising an electric control means, a processor means and a timer means, said electric control means, said processor means and said timer means positioned within said housing, wherein cool air is drawn by said second impeller over and through said electric control means, said processor means and timer means for cooling purposes.

15. The bread making apparatus of claim 1, wherein said baking chamber is molded out of a plastic material.

16. The bread making apparatus of claim 3, further comprising torque transferring means for transferring torque from said electric motor to said mixing blade positioned within said baking pan.

17. The bread making apparatus of claim 1, wherein said first impeller is a centrifugal impeller.

18. The bread making apparatus of claim 1 wherein said second impeller is a centrifugal impeller.

* * * * *